Aug. 24, 1926.
H. M. LAMBERT
1,597,381
CUSHION TIRE
Filed May 13, 1924 2 Sheets-Sheet 2
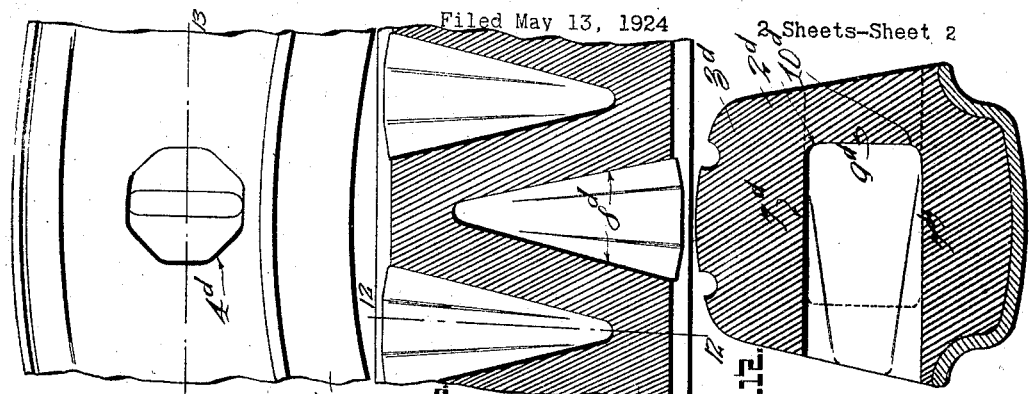
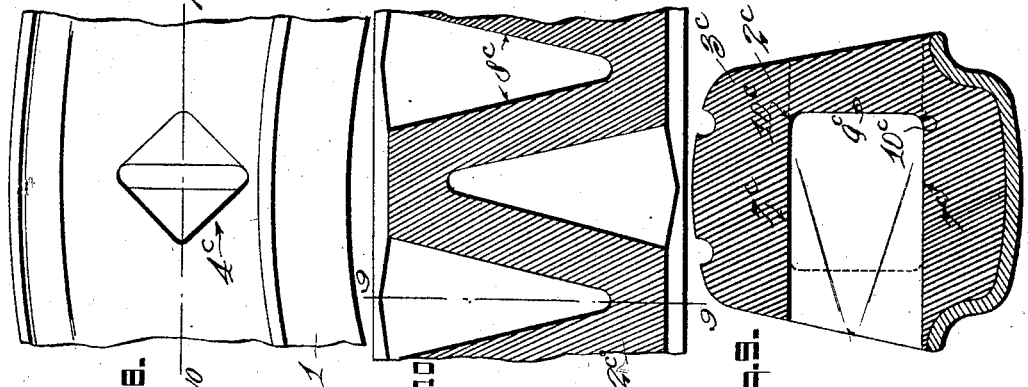
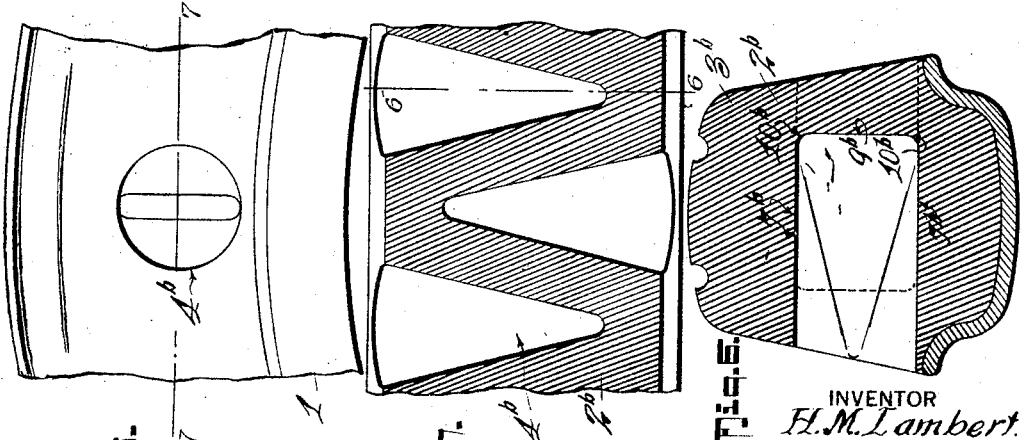
INVENTOR
*H. M. Lambert.*
BY
*Albert E. Dieterich*
ATTORNEY Patented Aug. 24, 1926.

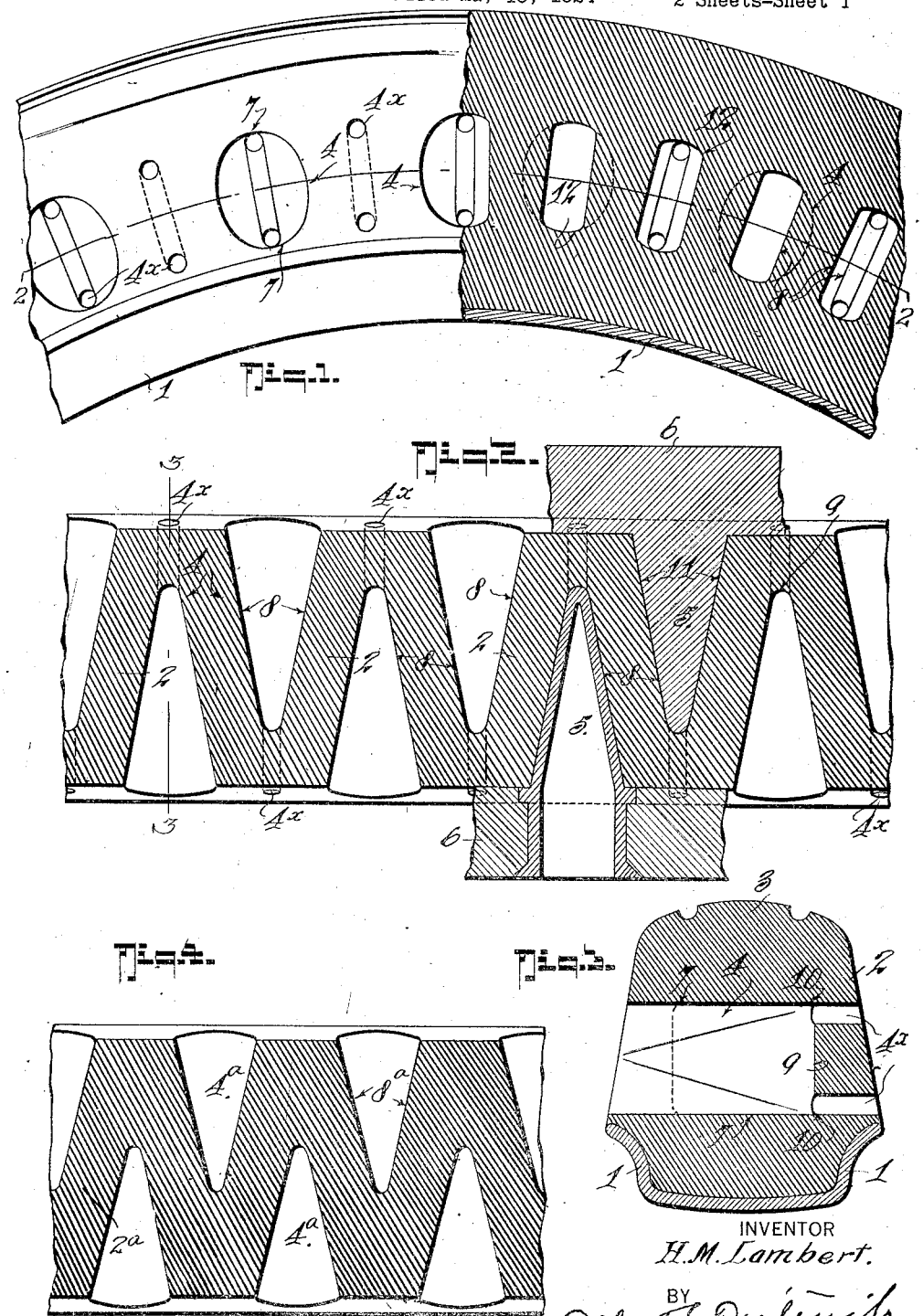

1,597,381

UNITED STATES PATENT OFFICE.

HENRY M. LAMBERT, OF PORTLAND, OREGON.

CUSHION TIRE.

Application filed May 13, 1924. Serial No. 713,051.

The invention relates to vehicle tires of the ventilated cushion type manufactured especially for use on automobiles or the like, and has for its general object to provide an improved structure of that type of tire such as will effect an economic advance in the art and have the quality of being especially "easy riding".

In its more detailed nature the invention seeks to provide a structure of the type of tire stated which will be more simple and economic to manufacture than tires of a kindred nature in that it may be more easily "stripped", one that will have the quality of being especially "easy riding" due to the well balanced arrangement of ventilating pockets and the peculiar shape thereof, providing a particularly uniform amount of rubber to sustain the load and take up the shock of the road and for the presence of a slight bit of additional stock along the outer sides of the tire than at the circumferential center.

With the above and other objects in view the invention further resides in those novel details of construction, manner of arrangement and advantages, all of which will be first fully described, then be particularly pointed out in the appended claims, reference being had to the accompanying drawings, in which:—

Figure 1 is a side view of a portion of the tire, a part thereof being shown in central longitudinal section.

Figure 2 is a horizontal section of the tire taken through the ventilating pockets thereof substantially on the line 2—2 of Figure 1, portions of two forms of pocket forming mandrels or cores being shown in place.

Figure 3 is a cross section of the tire taken across one of the ventilating pockets taken substantially on the line 3—3 of Figure 2.

Figure 4 is a fragmentary horizontal section similar to Figure 2 illustrating a slightly modified positioning of the ventilating pockets.

Figure 5 is a fragmentary side elevation illustrating a modification of the invention.

Figure 6 is a section on the line 6—6 of Figure 7.

Figure 7 is a section on the line 7—7 of Figure 5.

Figure 8 is a fragmentary side elevation illustrating another modification.

Figure 9 is a section on the line 9—9 of Figure 10.

Figure 10 is a section on the line 10—10 of Figure 8.

Figure 11 is a fragmentary side elevation of a still further modification.

Figure 12 is a section on the line 12—12 of Figure 13.

Figure 13 is a section on the line 13—13 of Figure 11.

In the drawings in which like numerals of reference indicate like parts in all of the figures, 1 designates the tire rim and 2 the body structure thereof, the latter being vulcanized or otherwise suitably secured upon the former as is conventional in tire construction.

The tire body structure 2 may be of any conventional cross sectional contour, as exemplified in Figure 3 of the drawings, and may include any conventional tread design, indicated at 3.

The feature of the invention resides in the shape and arrangement of the ventilating pockets 4. The pockets 4 are spaced equi-distantly around the lateral tire sides and project therefrom into the tire body on an axis paralleling the axis of the rim and to points beyond the medial plane of the said body. Those of the pockets at one side of the tire body are disposed alternately of those at the opposite side and with their axes disposed centrally between the positions of the axes of those of the opposite side.

The pockets 4 may be formed by mandrels or forming cores 5 formed integral with or attached to the mold side plates 6, both forms being illustrated in Figure 2 of the drawings.

The pockets 4 are all formed of a constant dimension in vertical cross section the top and bottom surfaces 7 thereof being, of course, parallel. See Figure 3. The horizontal cross sectional shape of the pockets are wedge shaped having the surfaces 8 thereof converging toward the inward limit of the same which is a vertical wall 9 positioned beyond the medial plane of the tire body. The surfaces 8 do not converge to a point but are joined at their termination by a smooth curve which forms the vertical wall 9. See Figure 2. The surfaces 7 are also curved at the ends thereof, where they meet the wall 9, as at 10.

In the form of the invention illustrated in Figures 1 to 3 of the drawings the shape of the pockets there shown can be best described by referring to the shape of the cores or mandrels 5 by which they may be formed. These mandrels or cores 5 are in the nature of oval spoke shapes, of a length for extending across the tire body the desired distance, and having the side portions thereof flattened as at 11, to provide the flat sides 8 of the pockets 4, and having the meeting portions of the said flat and rounded surfaces, which would otherwise be substantially angular, rounded on an easy curve to provide the curves 12.

The flat sides 11 of the cores 5 are so formed as to provide the flat side 8 of the pockets beginning at the entrance of the same into tire body sides and merging with the curve forming the limiting wall 9.

The pockets 4 are so cooperatively arranged that the adjacent flat sides 8 thereof are parallel, and, when extended the degree shown in Figure 2 of the drawing, provide a zig-zag wall of rubber entirely uniform in thickness at the central developed plane of the said pockets.

The pockets are shown as extended not so far across the medial line in Figure 4 of the drawings, the parallel side relation being retained however.

It will be readily apparent from Figure 1 of the drawings that the peculiar shaping and positioning of the ventilating pockets provides a very uniform amount of rubber presented for sustaining load and absorbing road shock and, by reason of the gradual decrease of flat area from the innermost point of each side 8 outward to the respective lateral tire side wall and the corresponding increase of curve thereby provided, a slight degree more of rubber will be provided along the lateral portions of the tire body than is present intermediate thereof. These features greatly add to the "easy riding" of the tire and the relative durability thereof.

It will be obvious also, by reference to Figures 5, 6 and 7, Figures 8, 9 and 10, and Figures 11, 12 and 13, that the ventilating pockets may be formed so as to be either round, square or diamond, or polygonal, in shape at the entrance thereof respectively, without departing from the scope of the invention as particularly pointed out in the appended claims. Those parts in Figure 4 corresponding to similar parts in the preceding figures bear the same reference characters plus the index letter ($a$); those parts in Figures 5, 6 and 7 which correspond to similar parts in the preceding figures have the same reference numerals plus the index letter ($b$); those parts in Figures 8, 9 and 10 corresponding to similar parts in the preceding figures have the same reference characters plus the index letter ($c$); those parts in Figures 11, 12 and 13 corresponding to similar parts in the preceding figures have the same reference characters plus the index letter ($d$).

Also, by reason of providing the tapered sides of the pockets and providing for curves instead of the sharp angles usually presented at the meeting points of faces, the stripping of the tire from its mold will be greatly facilitated and the tendency for mud and other foreign matter to lodge itself in the pockets in a manner rendering removal thereof very difficult will be greatly reduced.

By my arrangement it will be seen that the tire is always riding on an equal pillar or layer of rubber and this tends to prevent side-sway, very largely eliminating the same. If desired, small holes $4^x$, see Figure 3, may continue through the wall of the tire in the end of the "wedge" for cross ventilating purposes, though the use of these holes is a matter entirely optional and may be, and preferably are, dispensed with.

Where in the claims I refer to the "central vertical longitudinal section" of a pocket I have reference to a radial plane which includes the longitudinal axis of the pocket, and where in the claims I refer to the "central horizontal section" of a pocket, I have reference to a plane passing through the longitudinal axis of the pocket and lying normal to the aforesaid radial plane.

From the foregoing description, taken in connection with the accompanying drawings, it is thought that the novel details of construction, the manner of arrangement and the advantages of the invention will be readily apparent to those skilled in the art to which it relates.

Having thus described my invention, what I claim is:—

1. A cushion tire comprising an annular body having a plurality of pockets extending inwardly from each lateral side thereof part way across the annular tire body, the pockets being of constant dimension throughout their central vertical longitudinal section and wedge shaped throughout their central horizontal section.

2. A cushion tire comprising an annular body having a plurality of pockets extending inwardly from each lateral side thereof part way across the annular tire body, the pockets being of constant dimension throughout their central vertical longitudinal section and having flattened sides providing a wedge shape throughout their central horizontal section.

3. A cushion tire comprising an annular body having a plurality of pockets extending inwardly from each lateral side thereof part way across the annular tire body, on axes parallel the axis of the annular body, those at one side being positioned alternately of those at the opposite side, the pockets being of constant dimension throughout their central vertical longitudinal section and having flattened sides providing a wedge shape throughout their central horizontal section, the flattened sides of each pocket being parallel the nearest adjacent sides of the pockets extending from the opposite tire side.

4. A cushion tire comprising an annular body having a plurality of pockets extending inwardly from each lateral side thereof part way across the annular tire body, on axes parallel the axis of the annular body, those at one side being positioned centrally alternately of those at the opposite side, the pockets being of constant dimension throughout their central vertical longitudinal section and having flattened sides providing a wedge shape throughout their central horizontal section, the flattened sides of each pocket being parallel the nearest adjacent sides of the pockets extending from the opposite tire side providing a zig-zag central cushion area of substantially constant dimension.

5. A cushion tire comprising an annular body having a plurality of pockets extending inwardly from each lateral side thereof part way across the annular tire body, the pockets being of constant dimension throughout their central vertical longitudinal section and wedge shaped throughout their central horizontal section, and having all meeting portions thereof curved.

6. A cushion tire comprising an annular body having a plurality of pockets extending inwardly from each lateral side thereof part way across the annular tire body, the pockets being of constant dimension throughout their central vertical longitudinal section and having flattened sides providing a wedge shape throughout their central horizontal section, the surface width of the flattened sides decreasing from the innermost points thereof outwardly.

7. A cushion tire comprising an annular body having a plurality of pockets extending inwardly from each lateral side thereof part way across the annular tire body, the pockets being of constant dimension throughout their central vertical longitudinal section and having flattened sides providing a wedge shape throughout their central horizontal section, the surface width of the flattened sides decreasing from the innermost points thereof outwardly, and fading at the juncture thereof with the lateral tire body sides.

8. A cushion tire comprising an annular body having a plurality of pockets extending inwardly from each lateral side thereof part way across the annular tire body, on axes parallel the axis of the annular body, those at one side being positioned alternately of those at the opposite side, the pockets being of constant dimension throughout their central vertical longitudinal section and having flattened sides providing a wedge shape throughout their central horizontal section, the flattened sides of each pocket being parallel the nearest adjacent sides of the pockets extending from the opposite tire side, the surface width of the flattened sides decreasing from the innermost points thereof outwardly.

9. A cushion tire comprising an annular body having a plurality of pockets extending inwardly from each lateral side thereof part way across the annular tire body, on axes parallel the axis of the annular body, those at one side being positioned alternately of those at the opposite side, the pockets being of constant dimension throughout their central vertical longitudinal section and having flattened sides providing a wedge shape throughout their central horizontal section, the flattened sides of each pocket being parallel the nearest adjacent sides of the pockets extending from the opposite tire side, the surface width of the flattened sides decreasing from the innermost points thereof outwardly, and fading at the juncture thereof with the lateral tire body sides.

10. A cushion tire comprising an annular body having a plurality of pockets extending inwardly from each lateral side thereof part way across the annular tire body, on axes parallel the axis of the annular body, those at one side being positioned alternately of those at the opposite side, the pockets being of constant dimension throughout their central vertical longitudinal section and having flattened sides providing a wedge shape throughout their central horizontal section, the flattened sides of each pocket being parallel the nearest adjacent sides of the pockets extending from the opposite tire side, the surface width of the flattened sides decreasing from the innermost points thereof outwardly, and fading at the juncture thereof with the lateral tire body sides, the meeting portions of all meeting surfaces of the pockets being curved to provide for easy stripping.

11. A cushion tire comprising an annular body having a plurality of openings extending inwardly from each lateral side thereof toward the other side across the annular tire body, the openings being of constant dimension throughout their central vertical longitudinal section and having flattened side portions providing a wedge shape throughout their central horizontal section, the surface width of each flattened side portion decreasing from the innermost extremity outwardly.

12. A cushion tire comprising an annular body having a plurality of openings extending inwardly across the annular tire body from each lateral side thereof toward the opposite side, the pockets being of constant dimension throughout their central vertical longitudinal section and wedge shape throughout their central horizontal section, substantially as specified.

HENRY M. LAMBERT.